(12) United States Patent
Ohkawa

(10) Patent No.: US 8,028,284 B2
(45) Date of Patent: Sep. 27, 2011

(54) DATA PROCESSING SYSTEM AND PROGRAM FOR TRANSFERRING DATA

(75) Inventor: Yasukichi Ohkawa, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1366 days.

(21) Appl. No.: 11/590,676

(22) Filed: Oct. 31, 2006

(65) Prior Publication Data
US 2007/0106844 A1  May 10, 2007

(30) Foreign Application Priority Data

Nov. 4, 2005  (JP) .................................. 2005-321572

(51) Int. Cl.
*G06F 9/46* (2006.01)
*G06F 9/30* (2006.01)
(52) U.S. Cl. ......... 718/100; 718/101; 718/102; 712/214
(58) Field of Classification Search .................... None
See application file for complete search history.

(56) References Cited

U.S. PATENT DOCUMENTS

| | | | |
|---|---|---|---|
| 5,961,634 A * | 10/1999 | Tran | 712/218 |
| 7,243,354 B1 * | 7/2007 | Chhabra et al. | 719/314 |
| 7,844,799 B2 * | 11/2010 | Leenstra et al. | 712/216 |
| 2003/0065906 A1 * | 4/2003 | Rakvic et al. | 712/207 |
| 2003/0208672 A1 * | 11/2003 | Leenstra et al. | 712/200 |
| 2004/0128401 A1 * | 7/2004 | Fallon et al. | 709/250 |
| 2004/0187119 A1 * | 9/2004 | Janik et al. | 718/100 |
| 2006/0129723 A1 * | 6/2006 | Green et al. | 710/106 |

FOREIGN PATENT DOCUMENTS

JP     10240700     9/1998

OTHER PUBLICATIONS

Notification of Reason(s) for Refusal dated Feb. 19, 2008, for corresponding Japanese Patent Application JP 2005-321572.

* cited by examiner

*Primary Examiner* — Meng An
*Assistant Examiner* — Tammy Lee
(74) *Attorney, Agent, or Firm* — Katten Muchin Rosenman LLP

(57) ABSTRACT

A system is provided having a group of processors which performs coordinated processing, wherein data is transferred to the group of processors or from the group of processors. When data is transferred from an input queue, a ring buffer, to the group of processors, an identifier adding unit adds an identifier to the data as a tag, the identifier indicating a block that contains this data in the input queue. When data processed by any one of the processors included in the group of processors is transferred to an output queue, a block selecting unit selects one of blocks of the output queue as a block for storing the data, the one corresponding to the tag added to this data.

14 Claims, 17 Drawing Sheets

FIG. 5

| BIT STRING | INITIAL (WRITABLE) | WRITING | WRITE COMPLETED (READABLE) | READING | READ COMPLETED (WRITABLE) |
|---|---|---|---|---|---|
| 28a | 1 | 0 | 0 | 0 | 1 |
| 28b | 0 | 0 | 1 | 0 | 0 |

FIG. 9

| BIT STRING | INITIAL (WRITABLE) | WRITING | WRITE COMPLETED (READABLE) | READING | READ COMPLETED (WRITABLE) |
|---|---|---|---|---|---|
| 68a | 1 | 0 | 0 | 0 | 1 |
| 68b | 0 | 0 | 1 | 0 | 0 |

DATA PROCESSING SYSTEM AND PROGRAM FOR TRANSFERRING DATA

BACKGROUND OF THE INVENTION

1. Field of the Invention

The present invention relates to a technology for transferring data to a group of processors or transferring data from the group of processors in a system where the individual processors included in the group of processors perform coordinated processing.

2. Description of the Related Art

A multiprocessor system, or a system that implements a plurality of processors, can perform processing in parallel or in a coordinated fashion to achieve speedup of the entire processing. The coordinated processing by a plurality of processors is applied to part of the processing of the system. Such a system requires a process of transferring data generated by, for example, a processor that lies upstream of a plurality of processors in charge of the coordinated processing (hereinafter, referred to as a group of processors), to this group of processors, and a process of transferring data from this group of processors to a processor that lies downstream of this group of processors. The processing efficiency of the system depends on how these transfers are devised.

SUMMARY OF THE INVENTION

The present invention has been developed in view of the foregoing circumstances, and a general purpose thereof is to provide a data processing technology that is capable of transferring data to a group of processors or transferring data from the group of processors efficiently in a system where the individual processors included in the group of processors perform coordinated processing.

One embodiment of the present invention relates to a data processing system. This data processing system include a plurality of processors, an input queue, an output queue, an identifier adding unit, and a block selecting unit.

The input queue is divided into a plurality of blocks arranged in a predetermined order of arrangement. These blocks are each used as a location for storing data to be transferred to any one of the plurality of processors temporarily before transfer. The data is stored in the order of arrangement of the blocks, and transferred in the order stored.

The output queue is divided into a plurality of blocks, being as many as the number of blocks of the input queue, and being arranged in the same order of arrangement as the order of arrangement of the blocks in the input queue. The blocks are each used as a location for storing data processed by any one of the plurality of processors temporarily before output. The data is output in the order of arrangement of the blocks.

The identifier adding unit adds an identifier to data to be transferred from the input queue, the identifier corresponding to the order of arrangement of the block that contains this data.

The block selecting unit selects one of the blocks of the output queue as a block for storing data processed by a processor, the block having the order of arrangement corresponding to the identifier added to this data.

The block selecting unit may delete the identifier added to the data after the block selection.

The input queue and the output queue may be configured as ring buffers.

The identifier adding unit and/or the block selecting unit may be configured as a library.

This data processing system may further include: a storage control unit which controls storage of data in the input queue; an output counter which counts the total number of times data is output from the output queue; and an output number notification unit which notifies the storage control unit of the total number of times acquired by the output counter. The storage control unit includes an input counter which counts the total number of times data is stored in the input queue. The storage control unit permits the storing of data in the input queue if a difference between the total number of times acquired by the input counter and the total number of times acquired by the output counter is smaller than the number of blocks of the input queue.

Another embodiment of the present invention also relates to a data processing system. This data processing system includes: a plurality of processing units; an upstream processing unit which generates data and transfers the generated data to any one of the plurality of processing units; and a downstream processing unit which receives data processed by any one of the plurality of processing units.

The upstream processing unit includes: an input queue which is divided into a plurality of blocks, the blocks each being used as a location for storing data to be transferred to any one of the plurality of processing units temporarily before transfer; a transfer target assignment unit which assigns processing units for data to be transferred from the input queue to, from among the plurality of processing units in succession in accordance with a predetermined assignment rule; and a transfer unit which transfers the data to the processing units assigned by the transfer target assignment unit.

The plurality of processing units each have a transfer target location information transmitting unit which transmits transfer target location information when transferring processed data to the downstream processing unit, the transfer target location information indicating a location for this data to be transferred to in the downstream processing unit.

The downstream processing unit includes an output queue, transfer target location information holding units, a storing condition information acquisition unit, and a reference target assignment unit.

The output queue is divided into a plurality of blocks. The blocks are each used as a location for data to be transferred to by any one of the plurality of processing units, and store this data temporarily before being read.

The transfer target location information holding units are provided for the plurality of processing units, respectively, and hold transfer target location information transmitted from the respective processing units.

The storing condition information acquisition unit refers to the transfer target location information holding units and this acquires information that is necessary for reading data from the output queue, the information indicating the storing condition of the data in the output queue.

The reference target assignment unit assigns which of the transfer target location information holding units for the storing condition information acquisition unit to refer to in accordance with a predetermined assignment rule.

The input queue and the output queue may be configured as ring buffers.

The transfer target assignment unit and the reference target assignment unit may be configured as a library.

It should be appreciated that arbitrary combinations of the aforementioned constituting elements, and expressions of the present invention in the form of apparatuses, systems, programs, and recording media containing programs may also be practiced as applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a diagram showing the relationship between the bit values of the bit map shown in FIG. 4 and the states of the blocks in the input queue;

FIG. 9 is a diagram showing the relationship between the bit values of the bit map shown in FIG. 8 and the states of the blocks in the output queue;

DETAILED DESCRIPTION OF THE INVENTION

The invention will now be described by reference to the preferred embodiments. This does not intend to limit the scope of the present invention, but to exemplify the invention.

Figure 1:
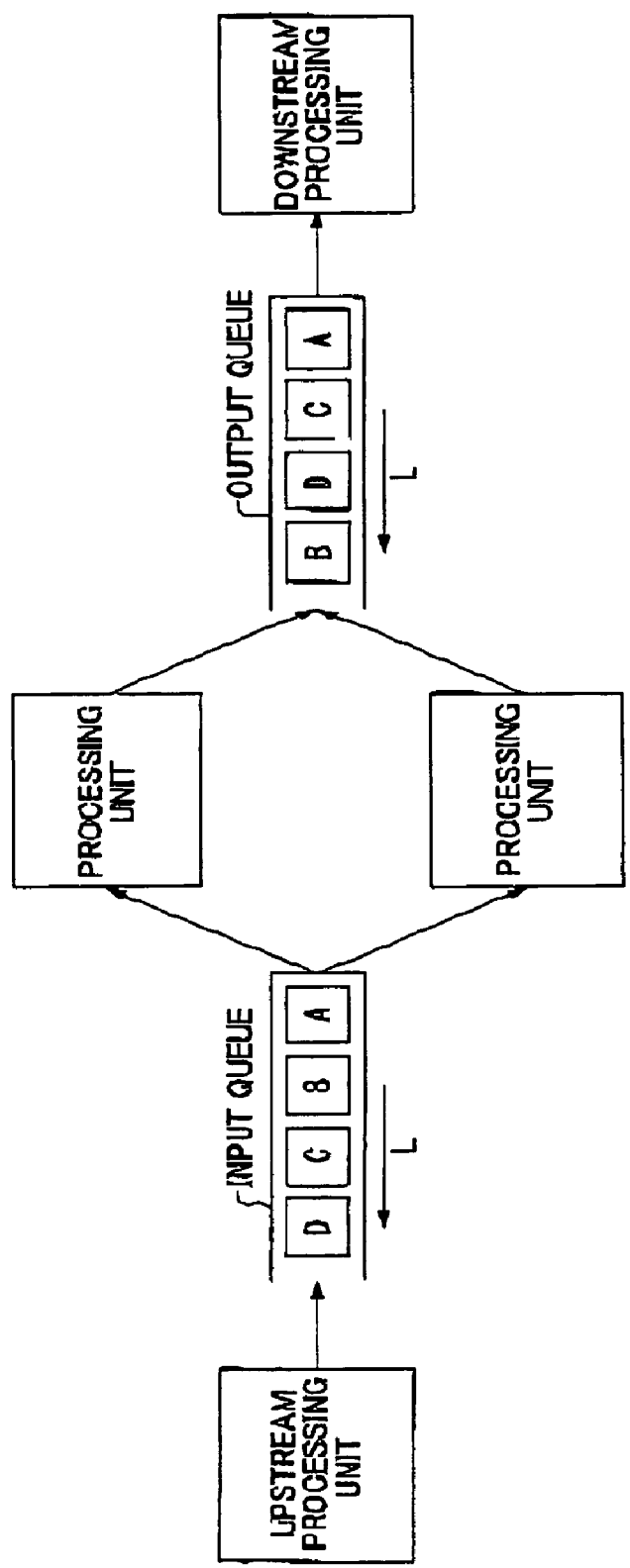
FIG. 1 is a diagram showing an example of a system to be compared with the system according to an embodiment of the present invention.

Initially, such a system as shown in FIG. 1 will be discussed. This system is composed of an upstream processing unit, a plurality (two, in the shown case) of processing units which perform coordinated processing, and a downstream unit. An input queue is interposed between the upstream processing unit and the plurality of processing units. An output queue is interposed between the plurality of processing units and the downstream processing unit.

The upstream processing unit stores generated data temporarily in the input queue. The input queue is configured as a ring buffer, having blocks which are arranged in order along the L direction shown in the diagram. The upstream processing unit writes data to the input queue in the order of arrangement of the blocks. The data stored in the input queue is transferred to the processing units such that it is transmitted from the upstream processing unit to any one of the processing units, or is read from any of the processing units in the order stored. In the shown example, pieces of data A, B, C, and D are written to the input queue in the order of arrangement of the blocks. These pieces of data are transferred to any of the processing units in the order stored.

The processing units process data transferred thereto, and transfer the processed data to the output queue. The output queue has the same configuration as that of the input queue.

Note that the processing units cannot always perform processing at the same speed. Then, pieces of data processed first are written to the output queue first. Since data is written to the output queue in the order of arrangement of the blocks, the order of the pieces of data in the output queue may sometimes differ from the order in which these pieces of data are stored in the input queue.

The data stored in the output queue is read in the order stored, i.e., in the order of arrangement of the blocks. A change in the order of data is thus inconvenient to the system.

Figure 2:
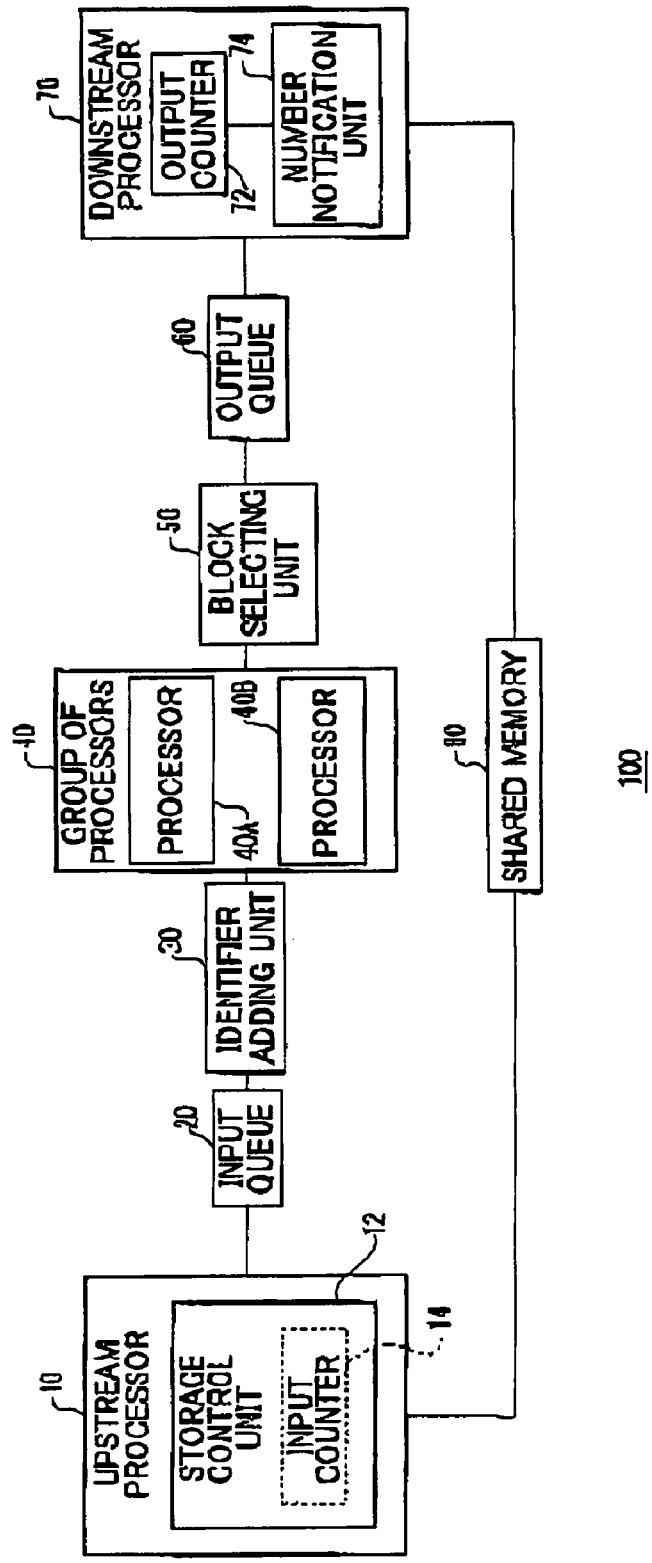
FIG. 2 is a diagram showing the data processing system according to a first embodiment of the present invention.

A data processing system 100 shown in FIG. 2 is one embodiment of the technology proposed by the inventor, and is capable of solving this problem. The data processing system 100 includes an upstream processor 10, an input queue 20, an identifier adding unit 30, a group of processors 40, a block selecting unit 50, an output queue 60, and a downstream processor 70. The upstream processor 10 and the downstream processor 70 are connected with a shared memory 80.

In FIG. 2 and the like, the individual elements shown as functional blocks for performing various types of processing can be constituted, in terms of hardware, by CPUs, memories, and other LSIs. In terms of software, they can be achieved by a program and the like that are loaded on a memory and have a data transfer function. It will thus be understood by those skilled in the art that these functional blocks may be achieved by various forms, including hardware alone, software alone, and combinations of these, and therefore not be limited to any one of them.

The upstream processor 10 is capable of executing multi-threads. Each thread generates data to be processed by any one of the processors included in the group of processors 40, and writes it to the input queue 20. The upstream processor 10 also includes a storage control unit 12 which controls data-writing to the input queue 20. The storage control unit 12 has an input counter 14 which counts the number of times the upstream processor 10 writes data to the input queue 20 (hereinafter, referred to as total write number).

The input queue 20 stores the data written by the upstream processor 10 temporarily before this data is read by the group of processors.

The group of processors 40 includes a plurality of processors, or two processors (processors 40A and 40B) in this case. These processors read data from the input queue 20, process the same, and write the processed data to the output queue 60.

The output queue 60 stores the data processed by the group of processors 40 temporarily before this data is read by the downstream processor 70.

The downstream processor 70 reads data from the output queue 60 for processing. The downstream processor 70 includes an output counter 72 and a number notification unit 74. The output counter 72 counts the number of times data is read from the output queue 60 (hereinafter, referred to as total read number). The number notification unit 74 transmits the total read number acquired by the output counter 72 to the shared memory 80.

The shared memory 80 updates and retains the total read number transmitted from the number notification unit 74.

The identifier adding unit 80 and the block selecting unit 50 will be described later.

Figure 3:
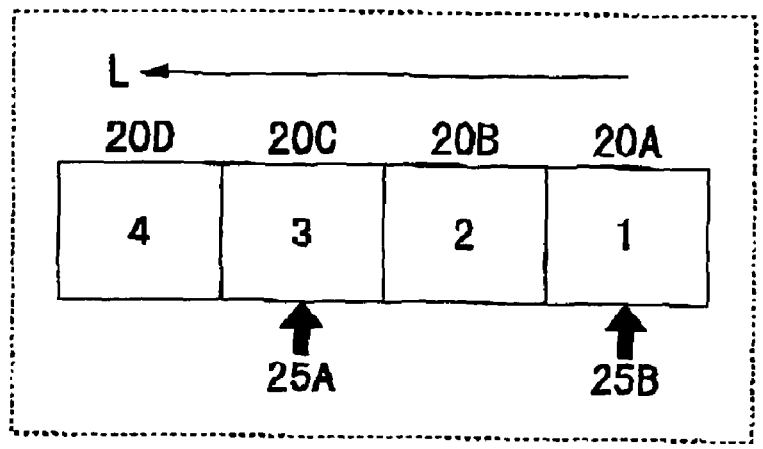
FIG. 3 is a diagram showing an input queue in the data processing system shown in FIG. 2.

FIG. 3 shows the configuration of the input queue 20. The input queue 20 is configured as a ring buffer, which is divided into a plurality of blocks, or four blocks in this case. These blocks are arranged in order of 20A, 20B, 20C, and 20D. The input queue 20 is provided with a write pointer 25A and a read pointer 25B. The write pointer 25A indicates a block that contains the latest piece of written data among those stored in the input queue 20, i.e., the piece of data that is written last by the upstream processor 10 (more specifically, the individual threads run on the upstream thread 10; the same holds for the following). The read pointer 25B indicates a block that contains the earliest piece of written data among those stored in the input queue 20. The write pointer 25A and the read pointer 25B advance in the direction along the order of arrangement of the blocks (in the shown example, in the direction L) by writing and reading under the constraint that they do not pass each other. The write pointer 25A is advanced by the upstream processor 10. The read pointer 25B is advanced by a processor that reads data among the group of processors 40.

The progression of the write pointer 25A and the read pointer 25B will now be described. The write pointer 25A is intended to instruct the upstream processor 10 which block to write next. The upstream processor 10 writes data to the block designated by the write pointer 25A.

Consider now that the block designated by the write pointer 25A contains data yet to be transferred to the group of processors 40, or that the data stored in this block is currently being transferred to the group of processors 40. In such cases, the previous data may disappear if the upstream processor 10 makes a write thereto. The upstream processor 10, when writing data, must therefore check whether the block designated by the write pointer 25A is in a writable state or in an unwritable state. Here, the "writable state" refers to situations where the data stored in this block is already transferred. The "unwritable state" refers to situations where the stored data is yet to be transferred, or the data stored in the block is currently under transfer.

The same holds for the read pointer 25B. The read point 25B is intended to instruct a processor that reads data from the input queue 20 (that is, any one of the processors included in the group of processors 40) which block to read next. This processor reads data from the block designated by the read pointer 25B. When reading, the processor needs to check whether this block is in a readable state or in an unreadable state. The "readable state" refers to situations where new data is already written to this block and is yet to be read. The "unreadable state" refers to situations where no data is written to this block, or some data is presently being written thereto.

The data processing system 100 ascertains the states of the respective blocks of the input queue 20 by using the following mechanism.

Figure 4:
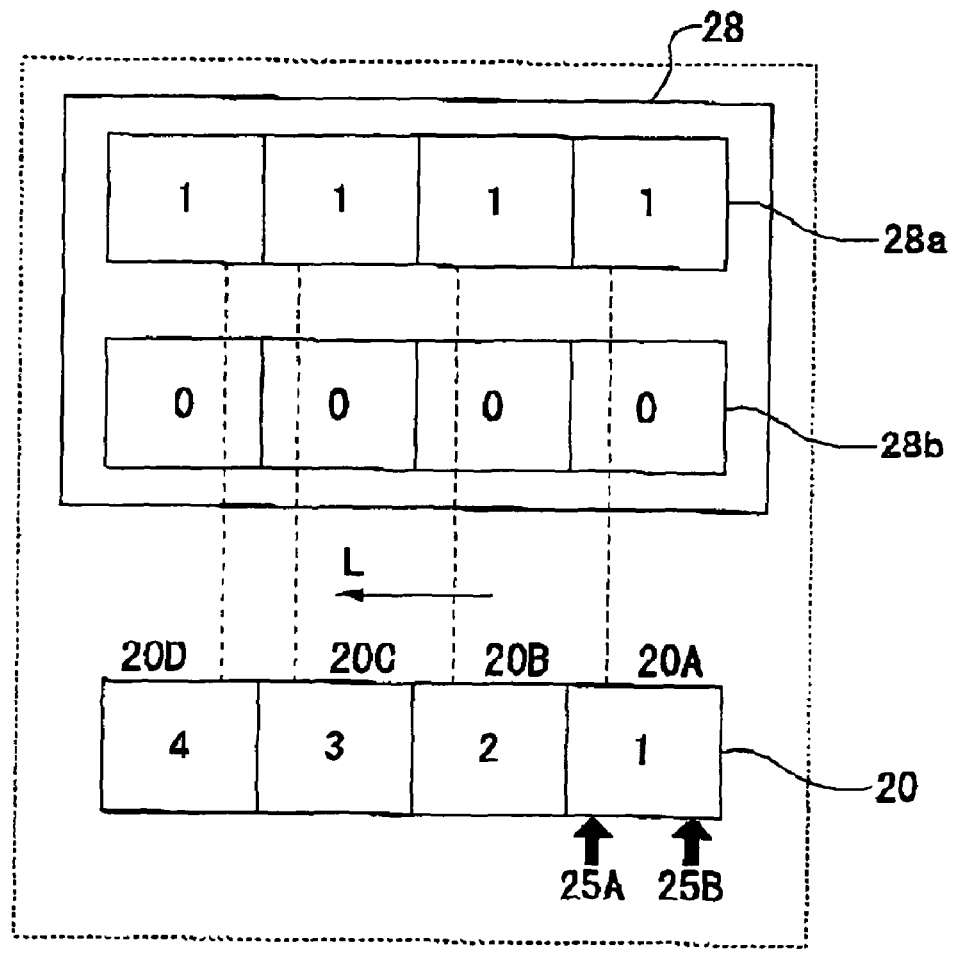
FIG. 4 is a diagram showing a bit map to be used for writing and reading to/from the input queue shown in FIG. 3.

Block state information for indicating the states of the respective blocks of the input queue 20 is updated and held in accordance with the progress of writing and reading. For example, a bit map 28 shown to the top of FIG. 4 is used for this block state information. The bit map 28 includes two bit strings 28a and 28b.

The bit strings 28a and 28b both have the same bit width as the number of blocks of the input queue 20, or 4 bits in this case. The bits included in the two bits strings correspond to the respective blocks of the input queue 20.

The bit string 28a is a bit string for writing. In an initial state, the individual bits have a value of 1, which shows that the respective blocks are in the writable state. The values of these bits are reset to 0 at the beginning of a write, and set to 1 at the end of a read.

The bit string 28b is a bit string for reading. In an initial state, the individual bits have a value of 0, which shows that the respective blocks are in the unreadable state. The values of these bits are set to 1 at the end of a write, and reset to 0 at the beginning of a read.

FIG. 5 shows a relationship between a set of the bit value of the bit string 28a and that of the bit string 28b and the block state corresponding to the set of the bit values.

It should be appreciated that in an initial state, as shown to the bottom in FIG. 4, the write pointer 25A and the read pointer 25B are located at the top block 20A of the input queue 20.

When writing to the input queue 20 in the initial state, the upstream processor 10 initially searches for the write pointer 25A and refers to the bit string 28a to check the state of the block designated by the write pointer 25A. Here, the write pointer 25A designates the block 20A, and the bit of the bit string 28a corresponding to the block 20A has a value of 1 (block 20A: writable). The upstream processor 10 then starts writing to the block 20A and advances the write pointer 25A to the next block 20B. Moreover, when it starts writing, the upstream processor 10 resets the bit of the bit string 28a corresponding to the block 20A from a value of 1 to a value of 0.

When the write to the block 20A ends, the upstream processor 10 sets the bit of the bit string 28b corresponding to the block 20A from a value of 0 to a value of 1.

In this state, if any one of the processors in the group of processors 40 reads data from the input queue 20, it initially searches for the read pointer 25B and refers to the bit string 28b to check the state of the block designated by the read pointer 25B. Here, the read pointer 25B designates the block 20A, and the bit of the bit string 28b corresponding to the block 20A is set to the value of 1 by the writing upstream processor 10. The processor that tries to read therefore starts reading the block 20A and advances the read pointer 25B to the next block. Moreover, when it starts reading, this processor resets the bit of the bit string 29b corresponding to the block 20A from a value of 1 to a value of 0.

When the read from the block 20A ends, this processor sets the bit of the bit string 28a corresponding to the block 20A from a value of 0 to a value of 1.

It should be appreciated that the write pointer 25A and the read pointer 25B are advanced in the same direction under the constraint that they do not pass each other.

In this way, the write pointer 25A and the read pointer 25B are advanced in accordance with the writing and reading of the input queue, and the bits of the bit strings 28a and 28b are set and reset in value repeatedly.

The bit map 28 may be provided, for example, in an atomic area of a shared memory that is accessible from the upstream processor 10 and the group of processors 40 so that the bits are updated by atomic instructions. The bit map 28 and its updating process may otherwise be implemented as a library.

When data is read from the input queue 20, the identifier adding unit 30 adds thereto an identifier corresponding to the block that contains the data. For example, assuming that identifiers corresponding to, the blocks 20A to 20D are 1 to 4, respectively, the identifier of 1 is added to the data that is read from the block 20A.

Figure 6:
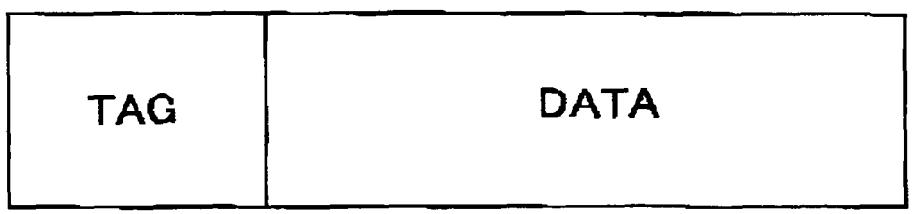
FIG. 6 is a diagram showing the structure of data to be transferred from the input queue in the data processing system shown in FIG. 2.

FIG. 6 shows the structure of data, to which an identifier is added by the identifier adding unit 30. In the example shown, the identifier is added to the data as a tag.

It should be appreciated that while the identifier adding unit 30 adds an identifier when data is read from the input queue 20, it may add the identifier to data when the data is written to the input queue 20. In that case, the data stored in the input queue 20 has the structure shown in FIG. 6.

The processors included in the group of processors 40 process data read from the input queue 20, and write the processed data to the output queue 60. Writing locations are selected by the block selecting unit 50. Here, the output queue 60 will first be described before the block selecting unit 50.

Figure 7:
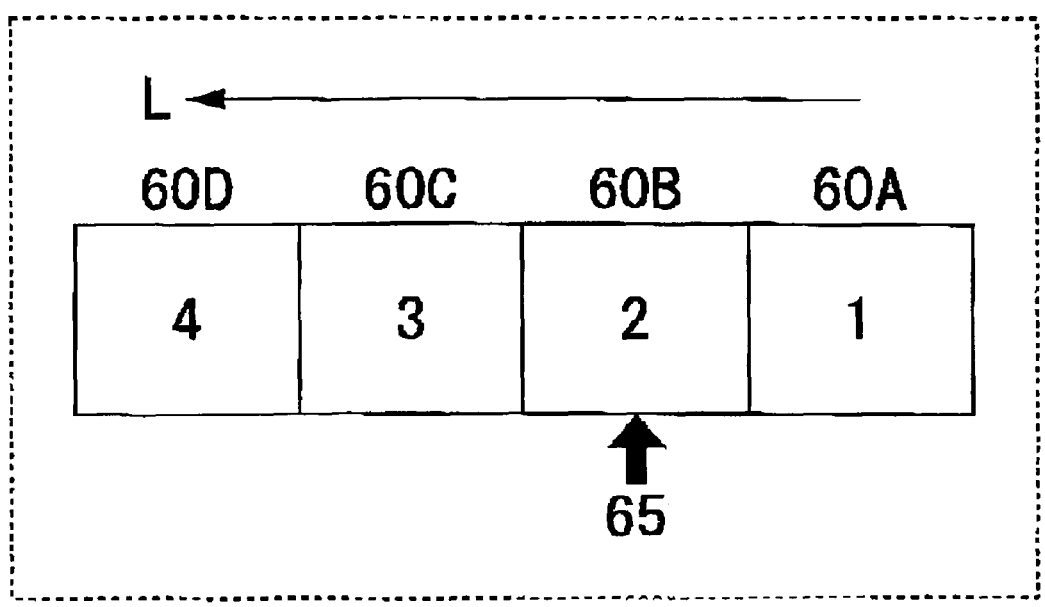
FIG. 7 is a diagram showing an output queue in the data processing system shown in FIG. 2.

FIG. 7 shows the configuration of the output queue 60. Like the input queue 20, the output queue 60 is configured as a ring buffer. It is divided into blocks as many as the number of blocks of the input queue 20, or four blocks. These blocks are arranged in order of 60A, 60B, 60C, and 60D, which is the same as the order of arrangement of the blocks in the input queue 20. The output queue 60 is provided with a read pointer 65. The read pointer 65 is located at the block 60A in an initial state, and is advanced in the direction along the order of arrangement of the blocks (the direction L in the diagram) in accordance with reading. The read pointer 65 is advanced by the downstream processor 70.

The downstream processor 70 reads data from a block designated by the read pointer 65 for processing. When reading, the downstream processor 70 advances the read pointer 65 from the current location to a location that designates the next block.

The downstream processor 70 is also capable of executing multi-threads, and the output queue 60 is read by each individual thread. When reading, each thread needs to identify if the block designated by the read pointer 65 is in a readable state. Here, the "readable state" refers to a state where a write is already finished and a read is yet to be performed. In other words, it refers to the state that does not correspond to any of "writing", "reading", and "read completed" states.

The information for indicating these states can also be expressed using a bit map as with the state information on the input queue 20.

Figure 8:
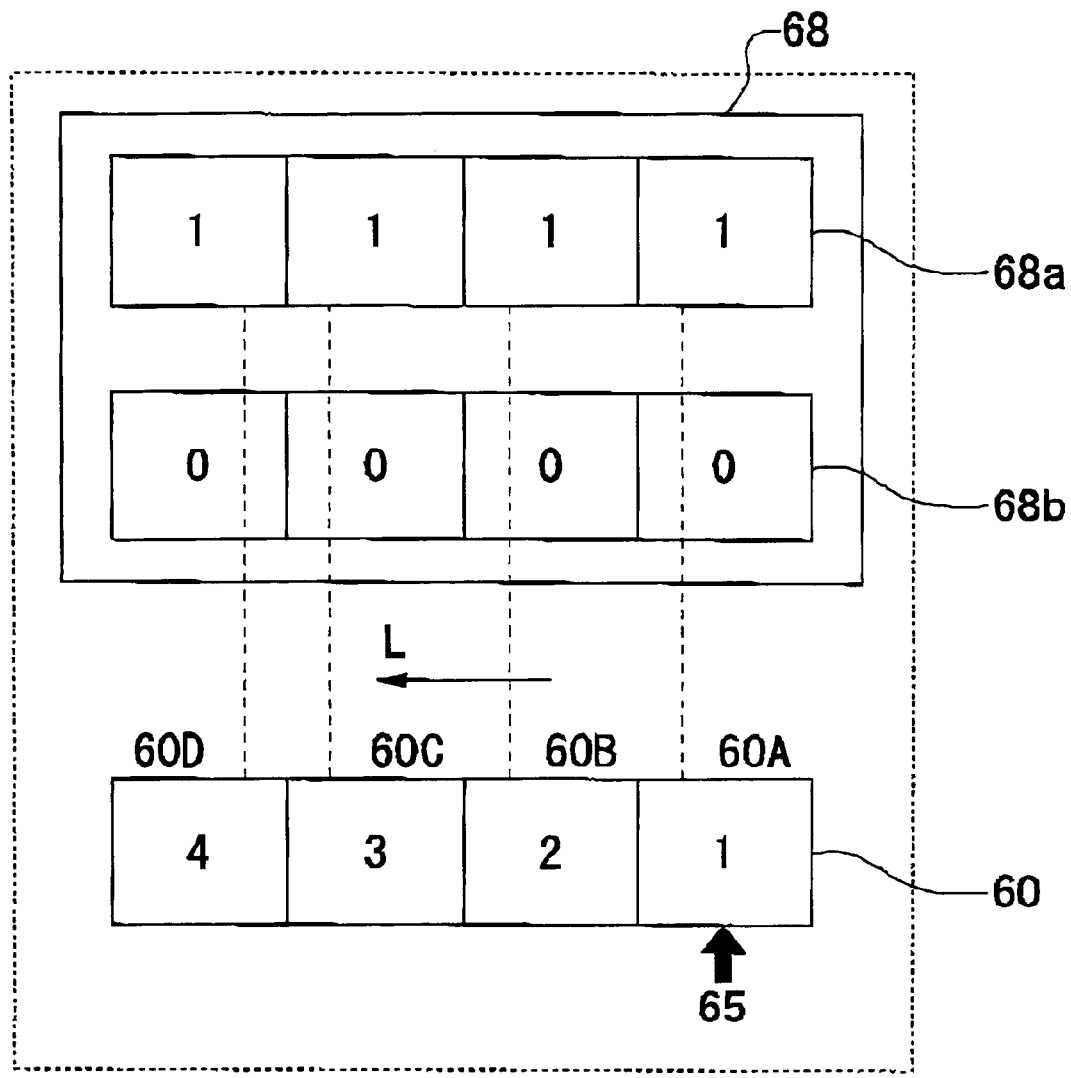
FIG. 8 is a diagram showing a bit map to be used for reading from the output queue shown in FIG. 7.

FIG. 8 shows the initial state of a bit map 68, which indicates the states of the respective blocks of the output queue 60. The bit map 68 also includes two bit strings 68a and 68b. The values of the bits of the bit string 68a are reset from 1 to 0 when a write to the respective blocks is started, and set from 0 to 1 when a read ends. The values of the bits of the bit string 68b are set from 0 to 1 when a write ends, and reset from 1 to 0 when a read starts.

FIG. 9 shows a relationship between a set of the bit value of the bit string 68a and that of the bit string 68b and the block state corresponding to the set of the bit values.

Each of the threads of the downstream processor 70 reads a block designated by the read pointer 65 only if the block is in the readable state, and advances the read pointer 65 to the next block when reading. As shown in FIG. 9, when a block is in the readable state, the bit of the bit string 68a corresponding to the block has a value of 1 and the bit of the bit string 68b corresponding to that block has a value of 0.

As with the bit map 28 intended for the input queue 20, this bit map 68 may also be provided in an atomic area of a shared memory that is accessible from the group of processors 40 and the downstream processor 70 so that it is updated by atomic instructions. The bit map 68 and its updating process may otherwise be implemented as a library.

A description will be provided of the block selecting unit 50. When any one of the processors included in the group of processors 40 writes data to the output queue 60, the block selecting unit 50 refers to the identifier added to this data and selects which of the blocks to write to. Specifically, if the identifier is 1, the block 60A corresponding to this identifier is selected as the block to write the data to. After the block selection, the block selecting unit 50 deletes the identifier added to the data to be written to this block.

A processor in the group of processors 40 writes data to the block selected by the block selecting unit 50.

When writing data to the input queue 20, the storage control unit 12 refers to the total read number retained in the shared memory 80 and exercises control. Specifically, the storage control unit 12 permits a data write to the input queue 20 only if the difference between the total write number acquired by the input counter 14 and the total read number obtained from the shared memory 80 is smaller than the number of blocks of the input queue 20 (four, in this case).

Figure 10:
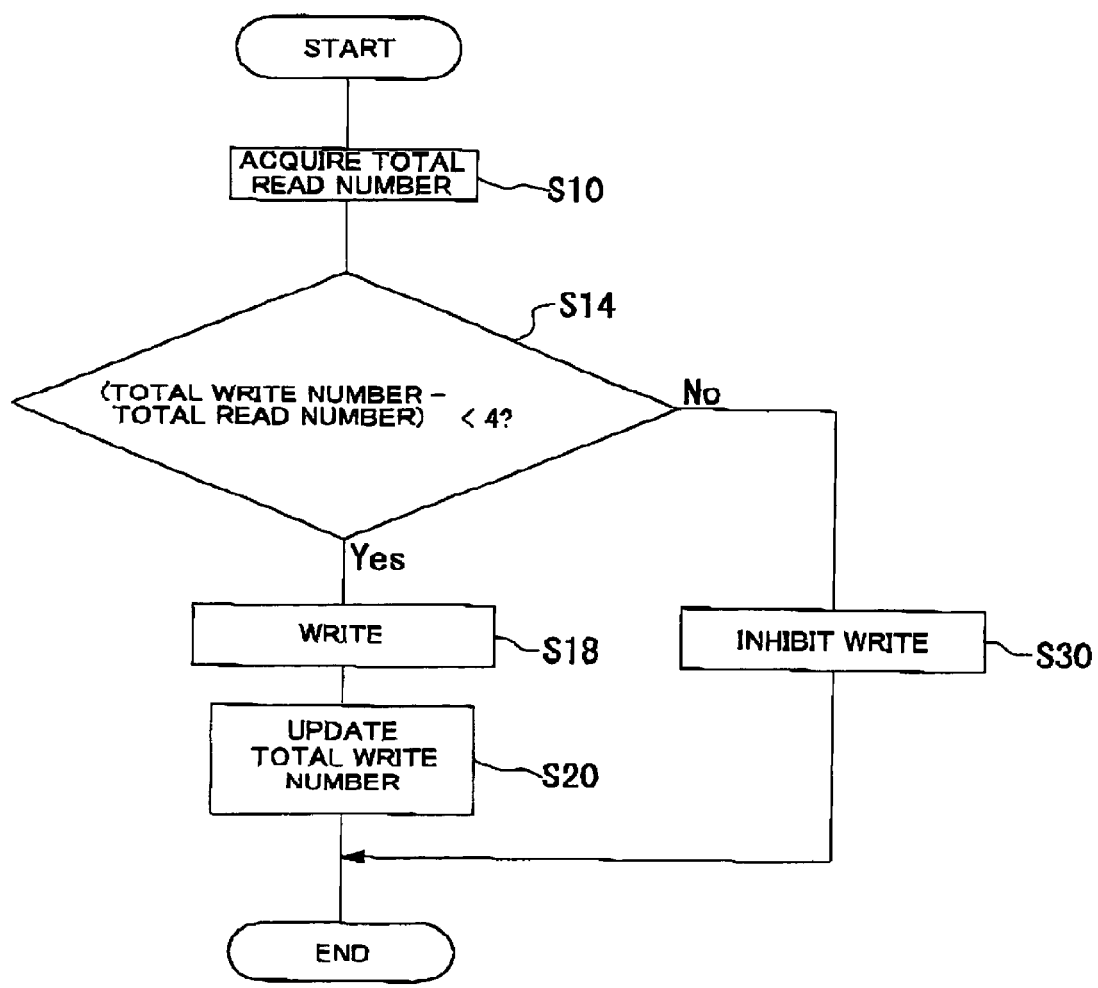
FIG. 10 is a flowchart showing a process when the upstream processor writes to the input queue in the data processing system shown in FIG. 2.

FIG. 10 is a flowchart showing the process when the upstream processor 10 writes to the input queue 20. When writing to the input queue 20, the upstream processor 10 initially acquires the total read number of the downstream processor 70 from the shared memory 80 using the storage control unit 12 (S10). The storage control unit 12 subtracts this total read number from the total write number counted by its own input counter 14, and checks whether or not the result is smaller than 4 (S14). If step S14 is positive (S14: Yes), the storage control unit 12 permits the upstream processor 10 to write. Data is thus written to the block that is designated by the write pointer 25A in the input queue 20. When writing the data, the input counter 14 of the storage control unit 12 adds 1 to the total write number for updating the total write number accordingly (S18, S20).

On the other hand, if step S14 is negative (S14: No), the storage control unit 12 inhibits write to the input queue 20 (S30).

Figure 11:
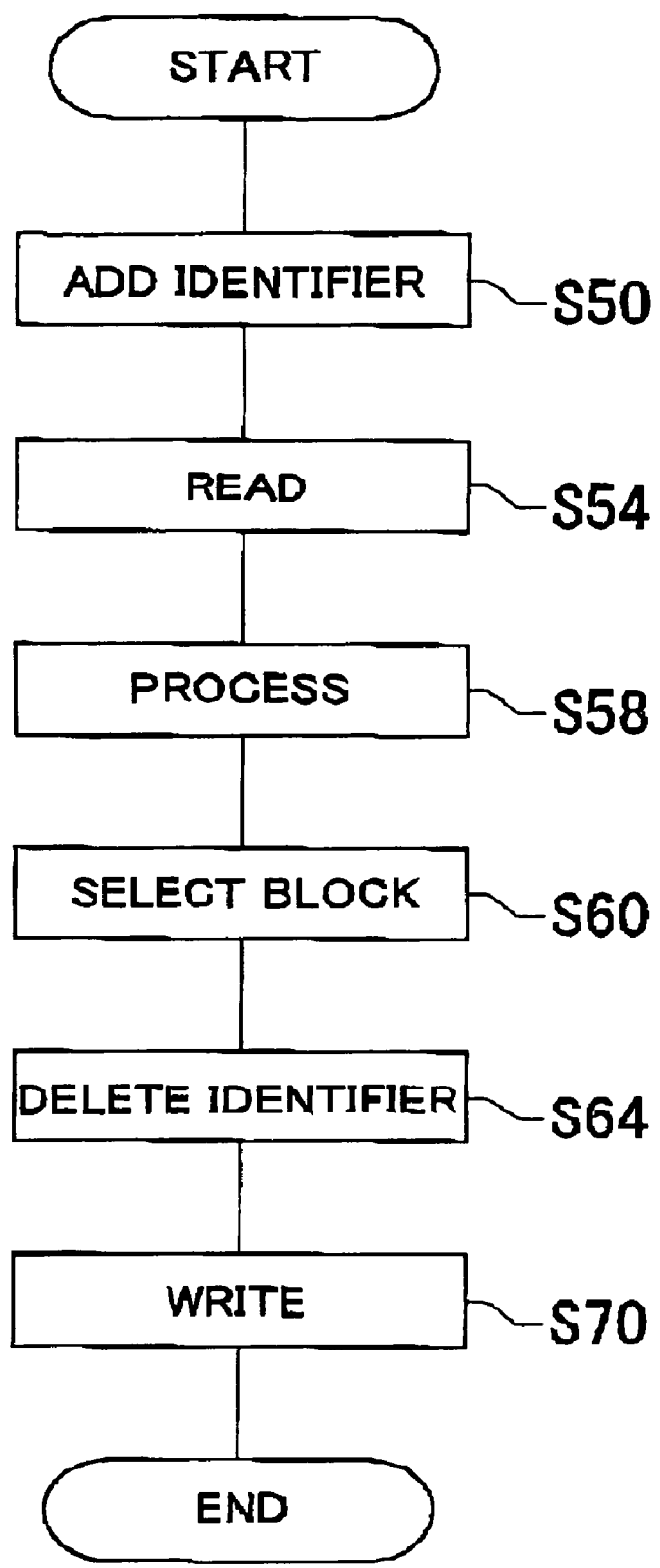
FIG. 11 is a flowchart showing a process from a data read from the input queue to a data write to the output queue in the data processing system shown in FIG. 2.

FIG. 11 is a flowchart showing the process from a data read from the input queue 20 to a data write to the output queue 60. When any one of the processors included in the group of processors 40 reads data from the input queue 20, the identifier adding unit 30 adds an identifier corresponding to the block that contains this data, or the block that is designated by the read pointer 25B, to the data (S50).

Then, the identifier-added data is read and processed by the processor in the group of processors 40 (S54, S58).

When the processor in the group of processors 40 tries to write the processed data to the output queue 60, the block to write to is selected by the block selecting unit 50 (S60). Specifically, the block selecting unit 50 refers to the identifier added to the data, and selects the block corresponding to the identifier from among the four blocks of the output queue 60. After this selection, the block selecting unit 50 deletes the identifier added to the data (S64), and the processor in the group of processors 40 writes this data to the selected block (S70).

Figure 12:
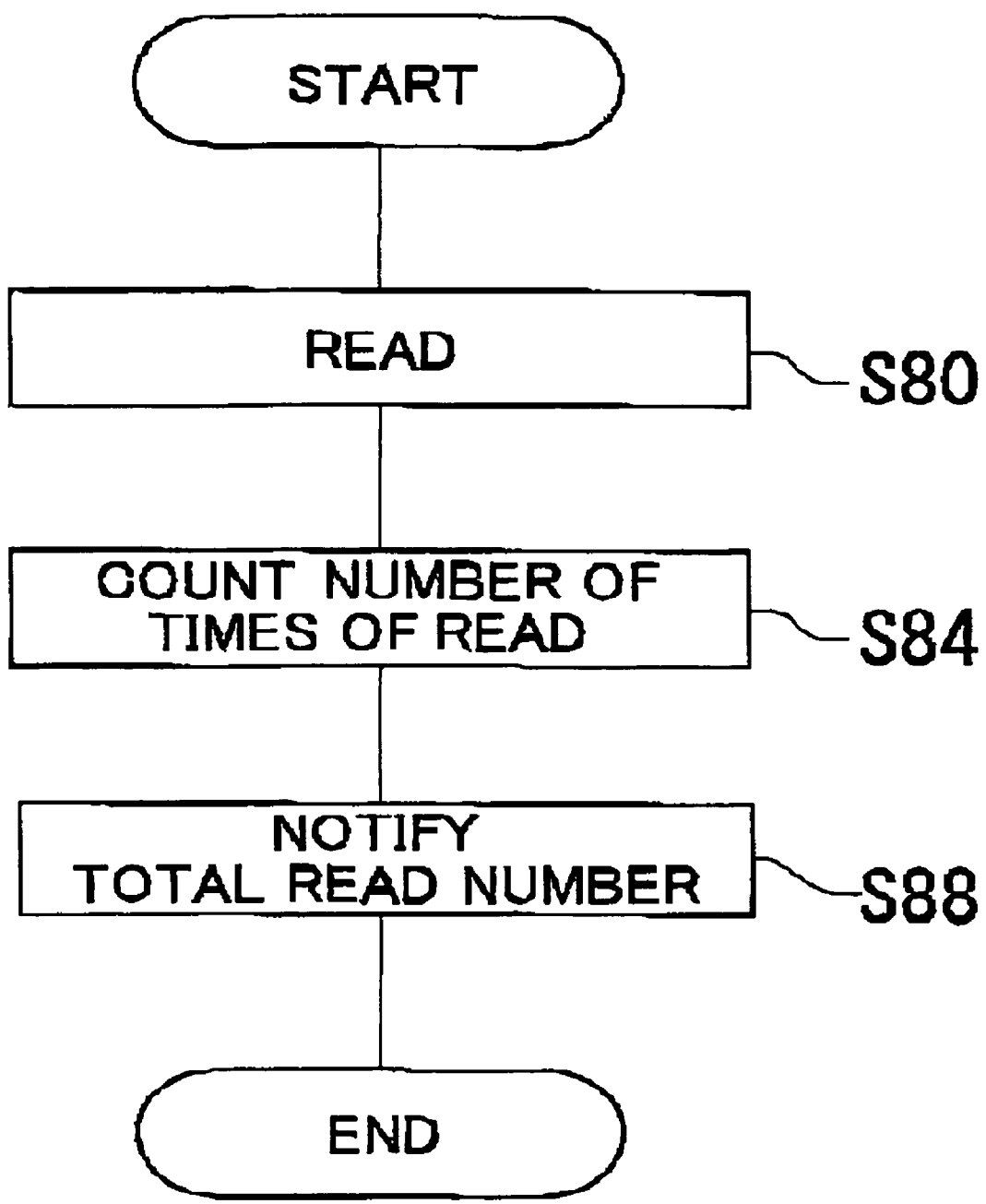
FIG. 12 is a flowchart showing a process for reading data from the output queue in the data processing system shown in FIG. 2.

FIG. 12 is a flowchart showing the process when the downstream processor 70 reads data from the output queue 60. The downstream processor 70 reads data from the block that is designated by the read pointer 65 (S80). When reading the data, the output counter 72 of the downstream processor 70 adds 1 to the total read number to obtain a new total read number (S84). The number notification unit 74 transmits the new total read number to the shared memory 80 (S88).

As described above, according to the data processing system 100, the input queue 20 and the output queue 60 have the same numbers of blocks, which are arranged in the same order. Data transferred from the input queue 20 is given an identifier of the block that contains this data in the input queue 20. After the data is processed by any one of the processors in the group of processors 40, it is stored in a block that corresponds to the identifier added to this data in the output queue 60. This prevents the data order from being altered as shown in FIG. 1.

The control exercised by the storage control unit 12 of the data processing system 100 provides an additional advantage to the data processing system 100. The storage control unit 12 permits the storing of data to the input queue 20 only if the number of pieces of data flowing between the input queue 20 and the output queue 60 is smaller than the number of blocks of the input queue 20. A description will now be given of the advantage that is provided by the storage control unit 12.

Figure 13:
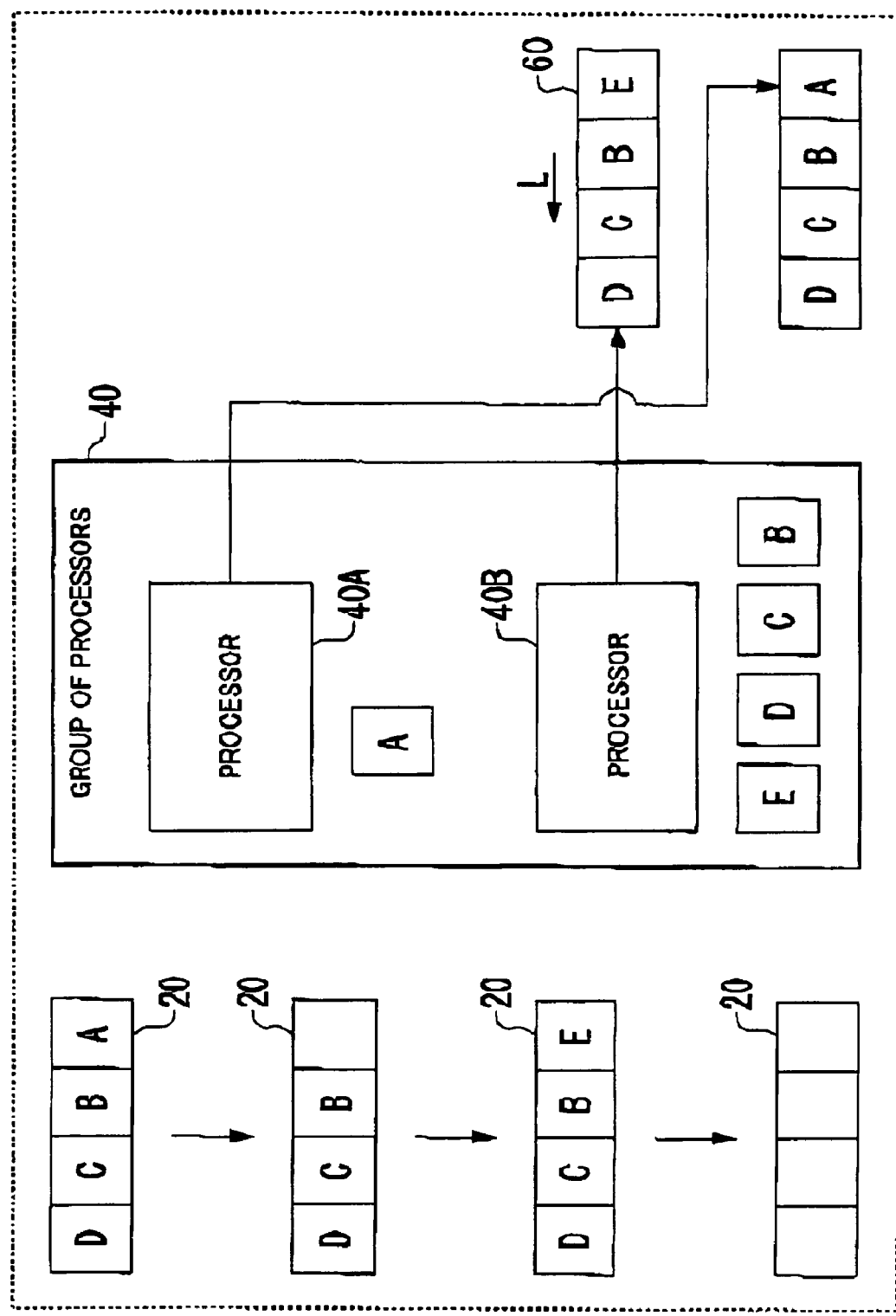
FIG. 13 is a diagram for explaining loss of data.

FIG. 13 shows a possible situation where the storage control unit 12 is disabled in the data processing system 100 shown in FIG. 2. Consider that the four blocks of the input queue 20 contain data A, B, C, and D, respectively, and the earliest-written data A is transferred to the processor 40A. When the upstream processor 10 generates new data E in this state, it wraps around and writes this data to the free block (the block that has contained the data A) since the input queue 20 is a ring buffer. Here, if the processor 40B has a processing speed higher than that of the processor 40A, it is possible for the four pieces of data stored in the input queue 20 to be transferred to the processor 40B in the order of B, C, D, and E. When the processor 40B processes and transfers these four pieces of data to the output queue 60, these pieces of data are stored to the four blocks of the output queue 60, respectively, in the same order as when stored in the input queue 20. Subsequently, the processor 40A finishes processing the data A, and writes the processed data A to the block that contains the data E. The data E will be lost in this case.

The storage control unit 12, in consequence, controls the number of pieces of data flowing between the input queue 20 and the output queue 60 so that the number of blocks of the output queue is smaller than the number of blocks of the input queue 20. This control guarantees the order of the data, and can avoid the loss of data such as that shown in FIG. 13.

The identifier adding unit 30 and the block selecting unit 50 may be implemented as libraries. This makes it possible even for the system shown in FIG. 1 to guarantee the order of data, simply by reading the libraries corresponding to the identifier adding unit 30 and the block selecting unit 50 when transferring data from the input queue 20 and when transferring data to the output queue 60, respectively.

Figure 14:
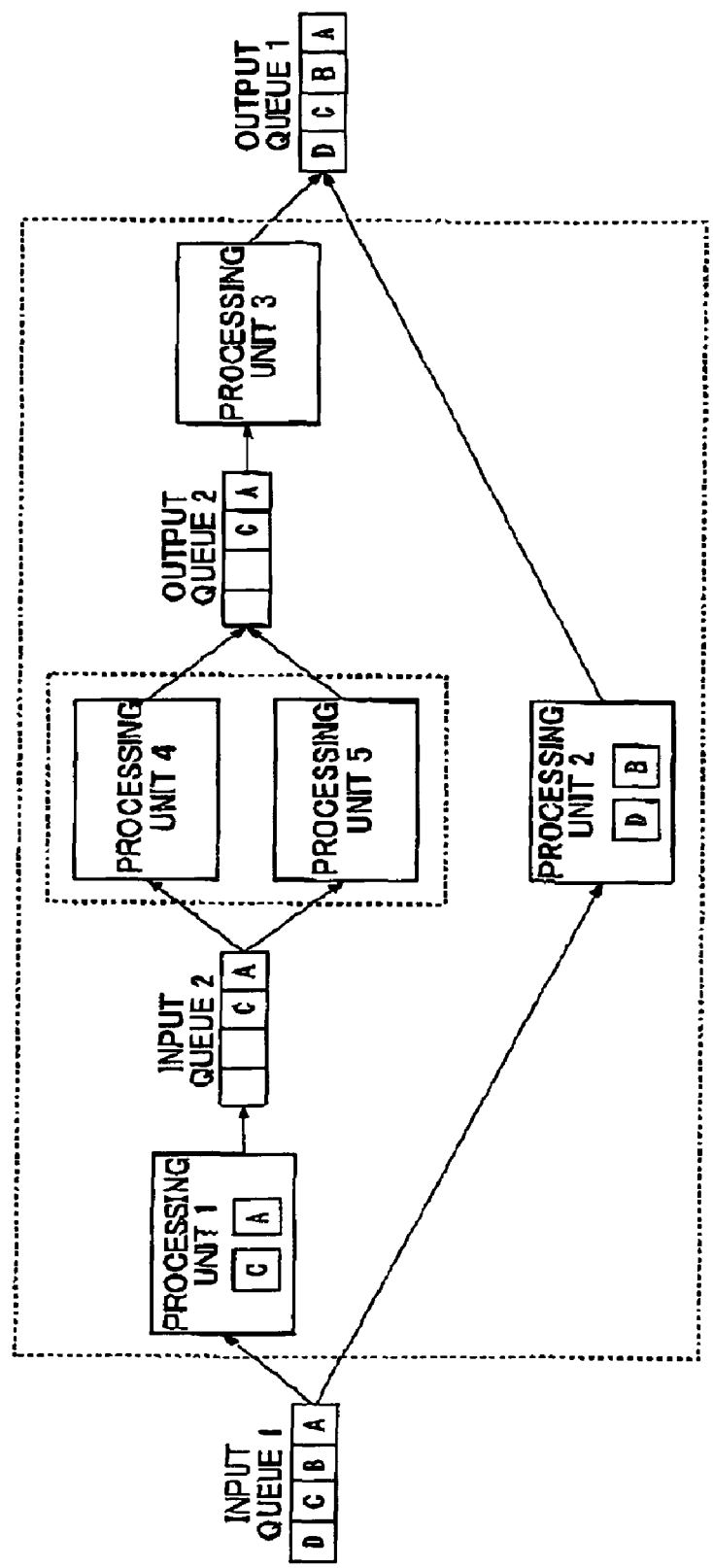
FIG. 14 is a diagram showing another system to which the technology of the data processing system shown in FIG. 2 is applied.

This technology proposed by the inventor may also be applied to a system where a plurality of processors perform coordinated processing using a hierarchical configuration. FIG. 14 shows an example thereof. In this system, the order of data between an input queue 1 and an output queue 1, and between an input queue 2 and an output queue 2, can be guaranteed by providing tags of a nested structure as described below.

When data is transferred from the input queue 1 to processing units 1 and 2, the identifiers of the blocks that contain the data are added as first tags. When data processed by the processing unit 2 is transferred to the output queue 1, the data is written to blocks corresponding to the first tags. Data processed by the processing unit 1 is transferred to the input queue 2. When the data is transferred from the input queue 2 to processing units 4 and 5, the identifiers of the blocks that contain the data in the input queue 2 are further added as second tags to the data which has the first tags. When data is transferred from the processing unit 4 or 5 to the output queue 2, the second tags are referred to and the data is written to the blocks corresponding to the second tags. The data is transferred from the output queue 2 to a processing unit 3, processed by the processing unit 3, and then transferred to the output queue 1. At this time, the first tags are referred to and the data is written to the blocks corresponding to the first tags.

In the foregoing systems, the input queue(s) and the output queue(s) may be implemented so that they are included in the upstream processing unit and the downstream processing unit, respectively.

Figure 15:
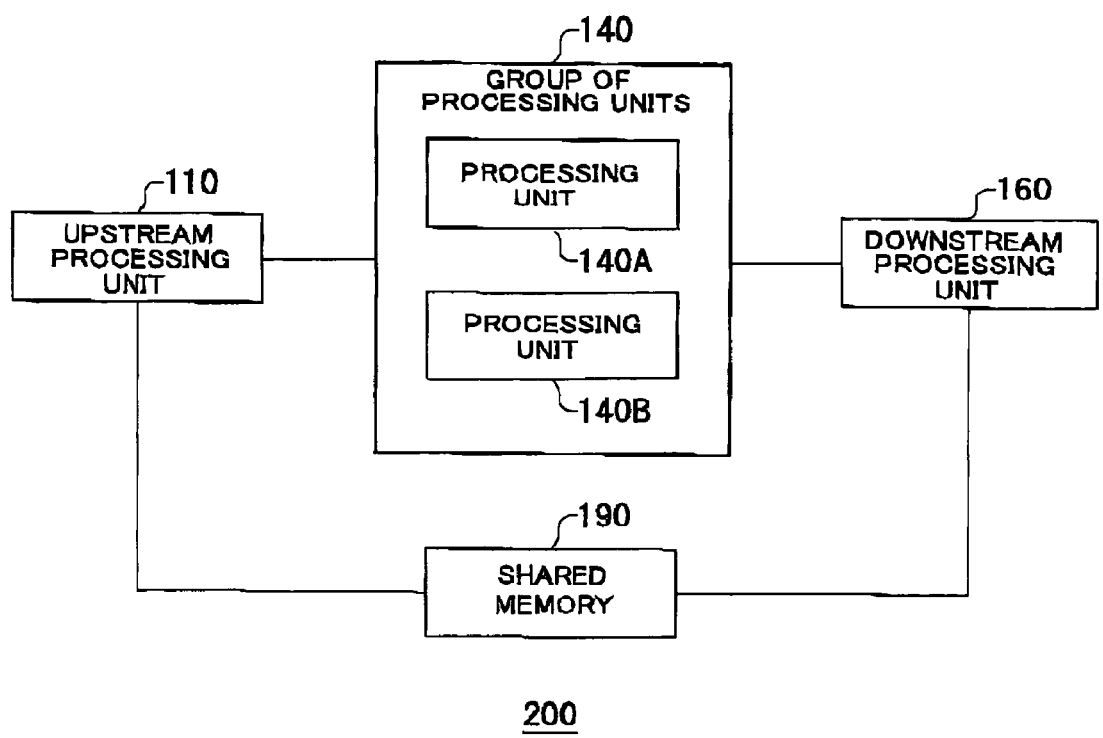
FIG. 15 is a diagram showing the data processing system according to a second embodiment of the present invention.

A second embodiment of the present invention will now be described. FIG. 15 shows a data processing system 200. The data processing system 200 includes an upstream processing unit 110, a group of processing units 140, and a downstream processing unit 160. The upstream processing unit 110 and the downstream processing unit 160 are connected with a shared memory 190.

The upstream processing unit 110 generates data and transmits it to any of the processing units in the group of processing units 140.

The group of processing units 140 includes a plurality of processing units, or two processing units (processing units 140A and 140B) in this case. These processing units process data transmitted from the upstream processing unit 110, and transmit the processed data to the downstream processing unit 160.

Figure 16:
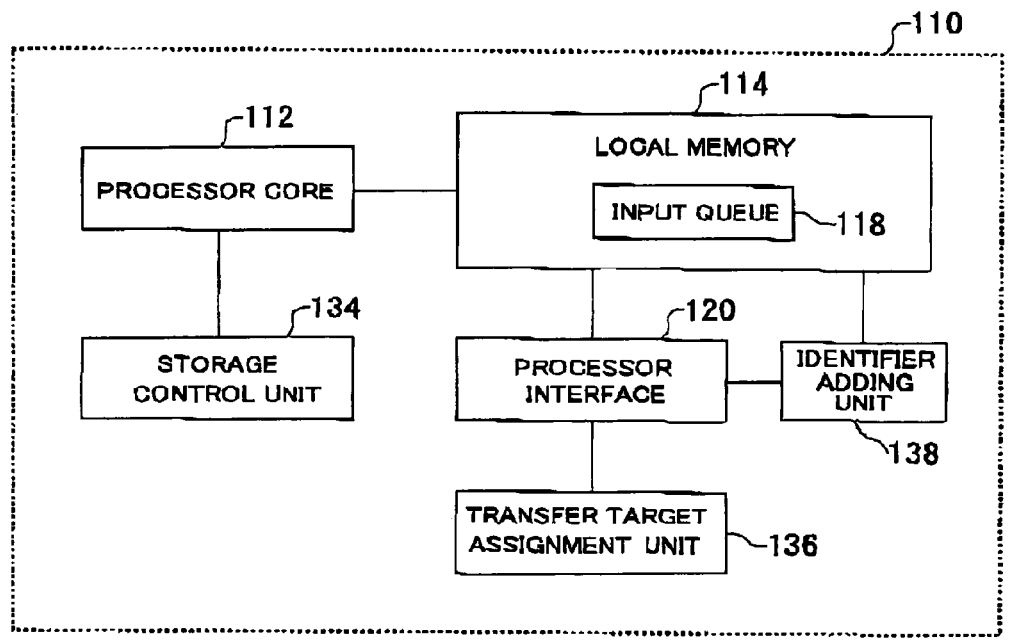
FIG. 16 is a diagram showing an upstream processing unit in the data processing system shown in FIG. 15.

FIG. 16 shows the configuration of the upstream processing unit 110. The upstream processing unit 110 has a processor core 112, a local memory 114, a processor interface 120, a storage control unit 134, a transfer target assignment unit 136, and an identifier adding unit 138. The local memory 114 includes an input queue 118 which is configured by means of software.

The processor core 112 is capable of executing multi-threads. Each thread writes generated data to the input queue 118.

The input queue 118 has the same configuration as that of the input queue 20 of the data processing system 100 shown in FIG. 2. A detailed description thereof will therefore be omitted here.

The storage control unit 134 and the identifier adding unit 138 also have the same configurations as those of the storage control unit 12 and the identifier adding unit 30 in the data processing system 100 shown in FIG. 2, respectively.

The transfer target assignment unit 136 assigns which of the processing units in the group of processing units 140 for the upstream processing unit 110 to transmit data to in accordance with a predetermined assignment rule. The assignment rule determines the order, the number of times, and the like of transmissions to be made to the individual processing units in the group of processing units 140. For example, a rule such as "two transmissions to the processing unit 140A, followed by one transmission to the processing unit 140B" is applied repeatedly. The data processing system 200 uses, for example, the assignment rule that transmissions are made to the two processing units alternately.

The processor interface 120 transmits data stored in the input queue 118 to a processing unit that is assigned by the transfer target assignment unit 136. The processor interface 120 will be detailed later.

It should be appreciated that when data is transmitted from the input queue 118, an identifier corresponding to the block that contains the data is added thereto by the identifier adding unit 138.

Figure 17:
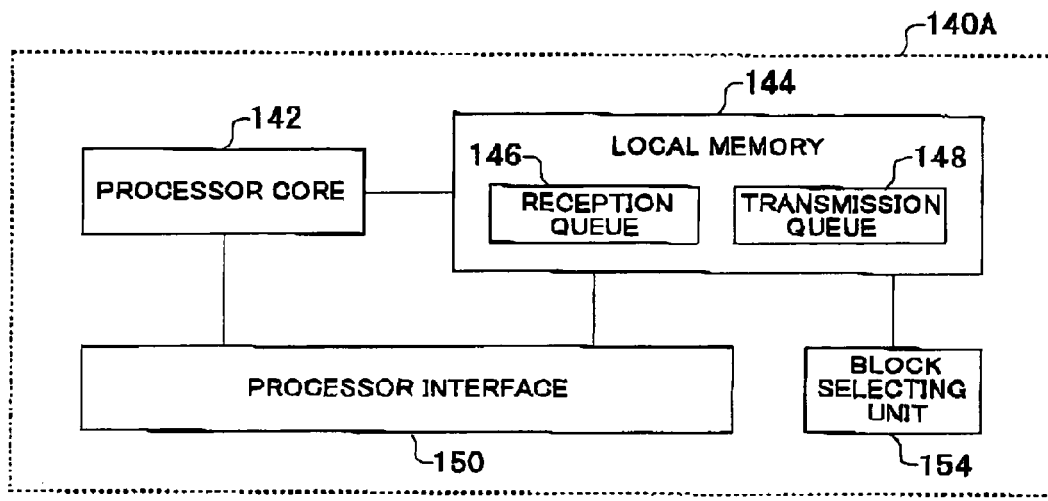
FIG. 17 is a diagram showing a processing unit included in a group of processing units in the data processing system shown in FIG. 15.

FIG. 17 shows the configuration of a processing unit included in the group of processing units 140, or the processing unit 140A in this case. The processing unit 140A has a processor core 142, a local memory 144, a processor interface 150, and a block selecting unit 154. The local memory 144 includes a reception queue 146 and a transmission queue 148 which are configured by means of software.

The processor core 142 processes data transmitted from the upstream processing unit 110.

The reception queue 146 stores the data transmitted from the upstream processing unit 110 temporarily before processing. The transmission queue 148 stores processed data temporarily before transmitting it to the downstream processing unit 160. These two queues are each configured as a ring buffer.

The processor interface 150 transmits data stored in the transmission queue 148 to the downstream processing unit 160. The block selecting unit 154 has the same function as that of the block processing unit 50 in the data processing system 100 shown in FIG. 2.

The processor interface 120 of the upstream processing unit 110 will now be described in detail. The processor interface 120 transmits data stored in the input queue 118 using a DMA (Direct Memory Access) transfer method, for example. When transmitting a single piece of data, the processor interface 120 performs two processes, or "data transmission" and "transmission notification" in succession.

The data transmission is a process for transmitting the data stored in the input queue 118. For example, a put command is used to perform this process. Using this data transmission, the data is transferred to the reception queue 146 that is provided in the local memory of the target processing unit.

The transmission notification is a process for transmitting a signal for notifying the target processing unit that data has been transmitted. For example, a sendsig command is used.

The commands for performing these two processes are issued by the processor interface 120, and are stored in a DMA queue (not shown) of the processor interface 120 before execution.

When the target processing unit receives the signal that has been transmitted by the transmission notification process, it is permitted to read the data from its own reception queue 146 since the data has already been transmitted to the reception queue 146.

It should be noted that the commands for instructing these two processes, stored in the DMA queue of the processor interface 120, may possibly be executed in reverse order. If the commands are executed in reverse order, a handshake error occurs where the notification signal for notifying that data has been transmitted is transmitted to the target processing unit before the transmission of the data.

In order to guarantee the order of execution of commands, the processor interface 120 uses a sendsigf command. The sendsigf command is one for executing transmission notification, accompanied by a fence attribute. Due to this attribute, the command for transmission notification will be never executed until the put command for data transmission is executed. This makes it possible to avoid handshake errors.

In this way, the processor interface 120 writes the data stored in the input queue 118 to the reception queues 146 of the processing units in the group of processing units 140 in the order stored.

The processing units 140A and 140B included in the group of processing units 140 process the data written in the reception queues 146 and write the processed data to the transmission queues 148 using their respective processor cores 142 (in terms of multi-threads, the respective threads running on the processor cores 142).

The processor interface 150 transmits data stored in the transmission queue 148 to the downstream processing unit 160. The processor interface 150 will now be described in detail along with the description of the downstream processing unit 160.

Figure 18:
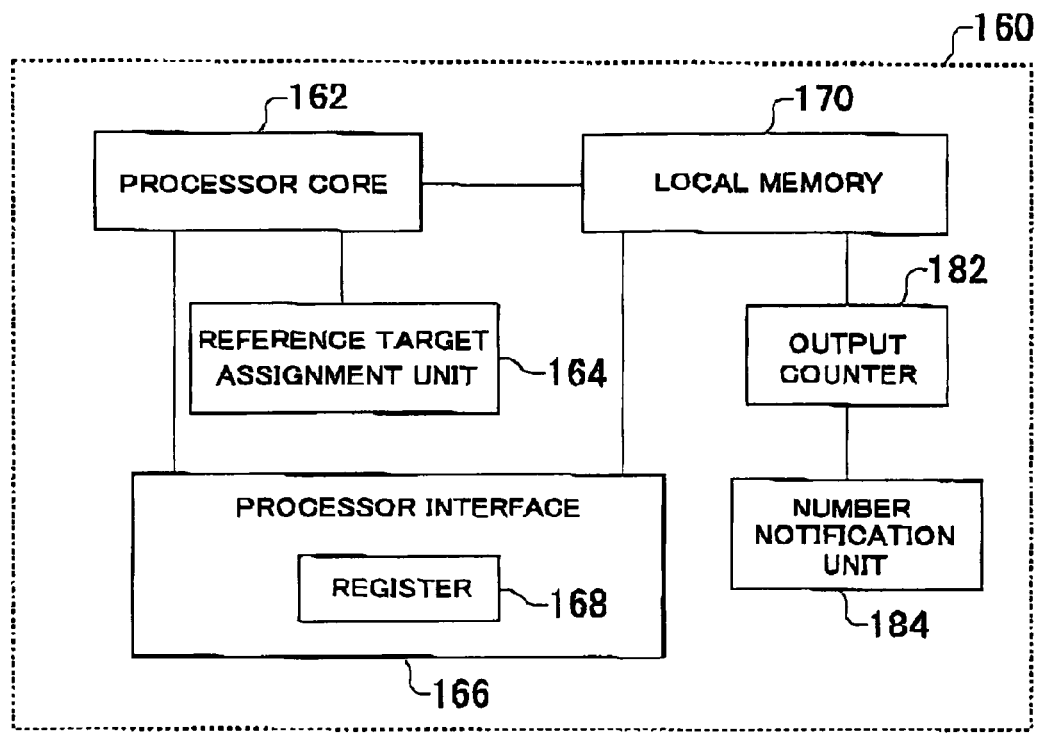
FIG. 18 is a diagram showing a downstream processing unit in the data processing system shown in FIG. 15.

FIG. 18 shows the configuration of the downstream processing unit 160. The downstream processing unit 160 has a processor core 162, a reference target assignment unit 164, a processor interface 166, a local memory 170, an output counter 182, and a number notification unit 184. The processor interface 166 includes a register 168.

Figure 19:
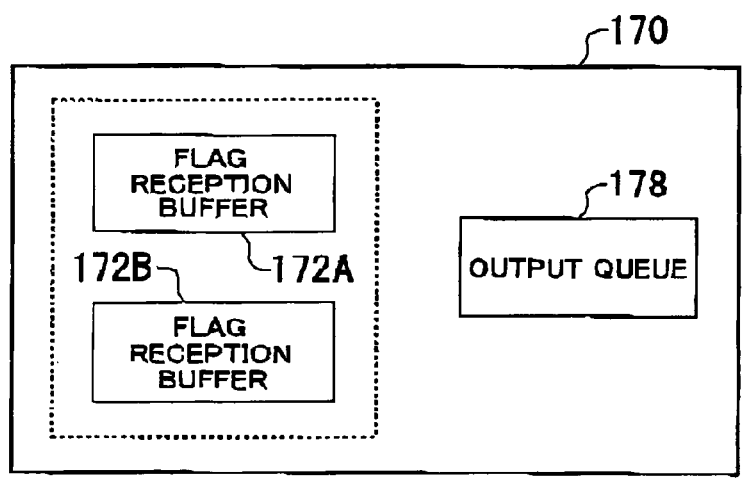
FIG. 19 is a diagram showing a local memory of the downstream processing unit shown in FIG. 18.

FIG. 19 shows the local memory 170. The local memory 170 includes flag reception buffers 172A and 172B, and an output queue 178. These components are configured by means of software.

Figure 20:
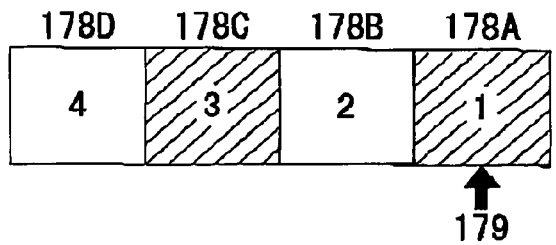
FIG. 20 is a diagram showing an output queue which is included in the local memory shown in FIG. 19.

FIG. 20 shows the output queue 178. The output queue 178 has the same configuration as that of the output queue 60 in the data processing system 100 shown in FIG. 2. The output queue 178 is divided into four blocks 178A to 178D in order of arrangement, with respective corresponding identifiers 1 to 4. The output queue 178 is provided with a read pointer 179.

The flag reception buffers 172A and 172B correspond to the processing units 140A and 1408 which transmit data to the downstream processing unit 160. It should be appreciated that the number of flag reception buffers is the same as the number of processing units which transmit data to the downstream processing unit 160, or two in this case. The flag reception buffers 172A and 172E have the same configuration. A description will thus be given with the flag reception buffer 172A as an example.

Figure 22:
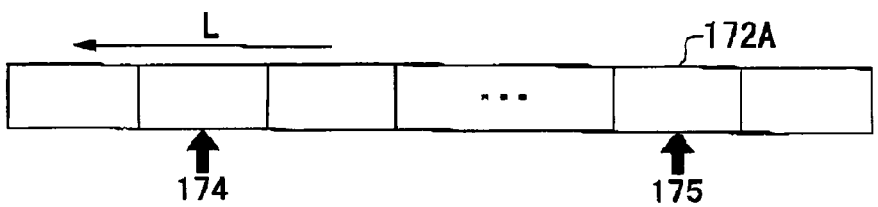
FIG. 22 is a diagram showing a flag reception buffer which is included in the local memory shown in FIG. 19.

FIG. 22 shows the flag reception buffer 172A. The flag reception buffer 172A is a FIFO ring buffer, and is divided into a plurality of blocks. The flag reception buffer 172A is provided with a write pointer 174 for writing and a read pointer 175 for reading. The writing and reading of the flag reception buffer 172A will be detailed later. Since the flag reception buffer 172A is a FIFO ring buffer, the transmitting side which writes to the flag reception buffer 172 can continue subsequent writes without waiting for a read by the receiving side which reads the flag reception buffer 172A.

A description will now be given of the processor interface 150 of the processing unit 140A which is included in the group of processing units 140. The processor interface 150 transmits data to the downstream processing unit 160 using a DMA transfer method, for example. When transmitting a single piece of data, the processor interface 150 performs three processes, or "data transmission", "flag data transmission" and "transmission notification" in succession.

The data transmission is a process for transmitting the data stored in the transmission queue 148. For example, a put command is used to perform this process. Using this data transmission, the data is transferred to the output queue 178 which is provided in the local memory 170 of the downstream processing unit 160.

During this data transmission, the block selecting unit 154 of the processing unit 140A refers to the identifier added to the data, and selects a block to write data to from among the four blocks of the output queue 178 in the downstream processing unit 160. Specifically, if the identifier is 1, the block 178A corresponding to this identifier is selected as the block to write the data to. It should be appreciated that after the block selection, the block selecting unit 154 deletes the identifier added to the data to be written to this block. The processor interface 150 transmits the data to the block that is selected by the block selecting unit 154.

The flag data transmission is a process for transmitting flag data, which indicates the block for the data transmitted by the data transmission to be stored in, or the block selected by the block selecting unit 154. A put command may be used for this process. Since the output queue 178 has four blocks, this flag data is 4-bit data. For example, flag data "0010" means that data is transmitted to the third block of the output queue 178 as seen in the order of arrangement of the blocks, i.e., the block 178C.

It should be appreciated that the flag data is transmitted to the flag reception buffer that is provided corresponding to the originating processing unit. Here, the processor interface 150 of the processing unit 140A transmits the flag data to the flag reception buffer 172A.

The processor interface 150 also retains the value of the write pointer 174 on the flag reception buffer 172A. When transmitting flag data, the processor interface 150 writes the flag data to the block designated by the write pointer 175, and advances the write pointer 174 by one along the direction of arrangement of the blocks (in the direction L in the diagram).

The transmission notification is a process for notifying the downstream processing unit 160 that data has been transmitted. A sendsigf command, accompanied with a fence attribute, is again used for the sake of avoiding a handshake error.

For the signal data for notifying that data has been transmitted, the processor interface 150 transmits a mask value that represents the processing unit 140A to which it belongs. This mask value makes it possible for the downstream processing unit 160 to identify which of the processing units the data is transmitted from. For example, the processing units 140A and 140B may have mask values of "10" and "01" respectively.

This mask value is transmitted to the register 168, which is provided in the processor interface 166 of the downstream processing unit 160.

The register 168 has a bit size as much as the number of processing units included in the group of processing units 140, or two bits in this case. When the register 168 receives a mask value from any of the processing units, it sets the bit corresponding to this mask value to 1.

The processor interfaces 150 of the processing units included in the group of processing units 140 transmit their respective mask values in a logical OR mode. As a result, even if the register 168 has a bit that has been already set to 1, and the mask value is transmitted from the corresponding processing unit continuously (or equivalently, this processing unit continues transmitting data to the downstream processing unit 160), the bit corresponding to this processing unit will be maintained to be 1.

Moreover, since the mask values are subject to the OR operation, it is possible to avoid loss of the mask values ascribable to a conflict even when the mask values are transmitted from the two processing units 140A and 140B at the same time.

Processing pertaining to a data read from the output queue 178 will now be described for the sake of explaining the purposes of the transmission of flag data to the flag reception buffer 172A and the transmission of mask values to the register 168.

The processor core 162 is capable of executing multi-threads. These threads read data from the output queue 178 for processing. When reading data from the output queue 178, each thread reads data from a block that is designated by the read pointer 179, and advances the read pointer 179 to the next block when it starts reading. If data is yet to be written to the block at the current position of the read pointer 179, then the thread comes to read null data or invalid data. To avoid this, the processor core 162 retains data that indicates the states of the respective blocks of the output queue 178, such as a bit map 176 shown in FIG. 21. The individual bits of this bit map correspond to the respective blocks of the output queue 178. In an initial state, all the bit values are 0.

Figure 23:
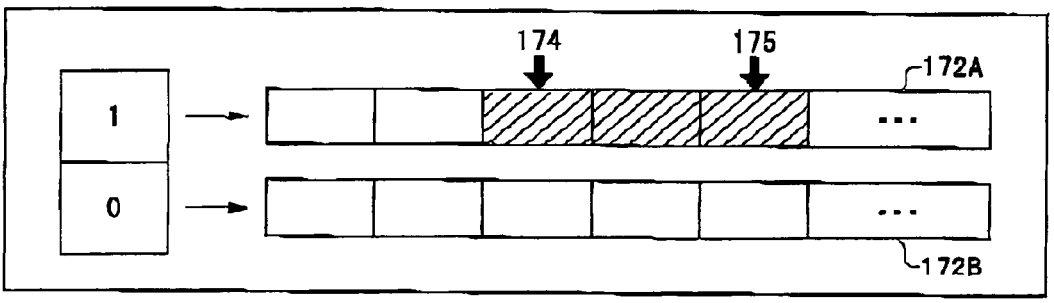
FIG. 23 is a diagram showing the correspondence between the bit values of the register included in the processor interface 166 of the downstream processing unit shown in FIG. 18 and the flag data stored in the flag reception buffer shown in FIG. 22.

When the register 168 receives a mask value, the processor core 162 is notified of it as an event. The processor core 162 makes reference to the register 168 in response. Between the two bits of the register 168, the bit set to a value of 1 indicates that data is transmitted from the processing unit corresponding to that bit. For example, in FIG. 23, the bit corresponding to the processing unit 140A is set to 1 and the bit corresponding to the processing unit 140B is reset to 0. In this case, the processor core 162 refers to the flag reception buffer 172A corresponding to the processing unit 140A.

The processor core 162 refers to the flag data stored in the block that is designated by the read pointer 175 out of the blocks of the flag reception buffer 172A, and thereby identifies which of the blocks of the output queue 178 the data is newly written to. The processor core 162 then sets the bit that corresponds to this block in the bit map 176 to a value of 1. The processor core 162 also deletes the flag data stored in the referred block of the flag reception buffer 172A, and advances the read pointer 175 by one. The processor core 162 performs these operations including referring to the flag data, updating the bit map, deleting the flag data, and advancing the read pointer 175 on each of the blocks in succession up to the write pointer 174. When the processor core 162 has made reference to all the blocks that contain flag data in the flag reception buffer 172A, it resets the bit value of the register 168 corresponding to the flag reception buffer 172A to 0. It should be appreciated that the processor core 162 will not change the bit value of the register 168 when any of the blocks that contain flag data remains yet to be referred to.

Now, if both the two bits of the register 168 are set to 1, it is impossible for the processor core 162 to determine which of the flag reception buffers to refer to. In such cases, the reference target assignment unit 164 of the downstream processing unit 160 instructs the processor core 162 which of the flag reception buffers to refer to.

The reference target assignment unit 164 assigns the flag reception buffer for the processor core 162 to refer to from either of the two flag reception buffers in accordance with a predetermined assignment rule. This assignment rule may be determined by system designers. In this example, the reference target assignment unit 164 makes assignments in a round-robin manner.

The processor core 162 refers to the flag reception buffer that is assigned by the reference target assignment unit 164. This reference is made as if only one of the two bits of the register 168 is set to a value of 1.

In this way, the processor core 162 updates the bit map pertaining to the output queue 178 by referring to the register 168 and the flag reception buffers.

Figure 21:
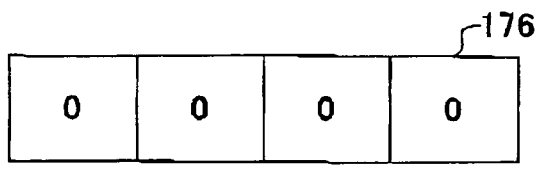
FIG. 21 is a diagram showing a bit map to be used for reading from the output queue shown in FIG. 20.

Subsequently, when reading data from the output queue 178, the thread running on the processor core 162 refers to the bit map 176 shown in FIG. 21 to check the state of the block that is designated by the read pointer 179. Specifically, a read is performed only if the bit value corresponding to the block designated by the read pointer 179 is 1. It should be appreciated that when reading starts, the thread resets the bit of the bit map 176 corresponding to this block to a value of 0, while the thread advances the read pointer 179 to the next block.

Since the bit map 176 is updated and retained thus, the threads running on the processor core 162 can perform a read safely, precluding the reading of null data or invalid data.

The output counter 182 of the downstream processing unit 160 counts up the total read number each time data is read from the output queue 178. The number notification unit 184 transmits the total read number acquired by the output counter 182 to the shared memory 190.

The shared memory 190 updates and retains the total read number, and supplies it to the storage control unit 134 which is included in the upstream processing unit 110.

The storage control unit 134 has an input counter (not shown) which counts up the total write number each time data is written to the input queue 118. The storage control unit 134 then exercises control based on the total write number acquired by the input counter and the total read number retained in the shared memory 190. Specifically, it permits a data write to the input queue 118 only if the difference between the total write number and the total read number is smaller than the number of blocks of the input queue 118 (four, in this case).

In this data processing system 200, data is transferred from the input queue and transferred to the output queue using a so-called signal notification method, which includes transmitting data and transmitting a signal for notifying the completion of the data transmission. This transfer method is an excellent technique for achieving a transfer of small latency, whereas it is applicable only when the transmitting side and the receiving side are in a one-on-one relationship. In the present embodiment, the upstream processing unit 110 on the transmitting side is provided with the transfer target assignment unit 136, and the downstream processing unit 160 on the receiving side is provided with the reference target assignment unit 164, whereby this technique is practiced on "one-to-many" and "many-to-one" transfers. This allows the efficiency of the entire system to be improved.

In addition to this, the technique for guaranteeing the order of data and the technique for avoiding the loss of data, used in the data processing system 100 shown in FIG. 2, are applied to achieve an even more advantageous system.

Furthermore, in the data processing system 200, the input queue 118, the reception queues 146 and transmission queues 148, and the output queue 178 are implemented on the local memories of the upstream processing unit 110, the processing units of the group of processing units 140, and the downstream processing unit 160, respectively. This makes it possible to transfer data directly between the local memories by DMA, providing a further improvement to the efficiency of the system.

Figure 24:
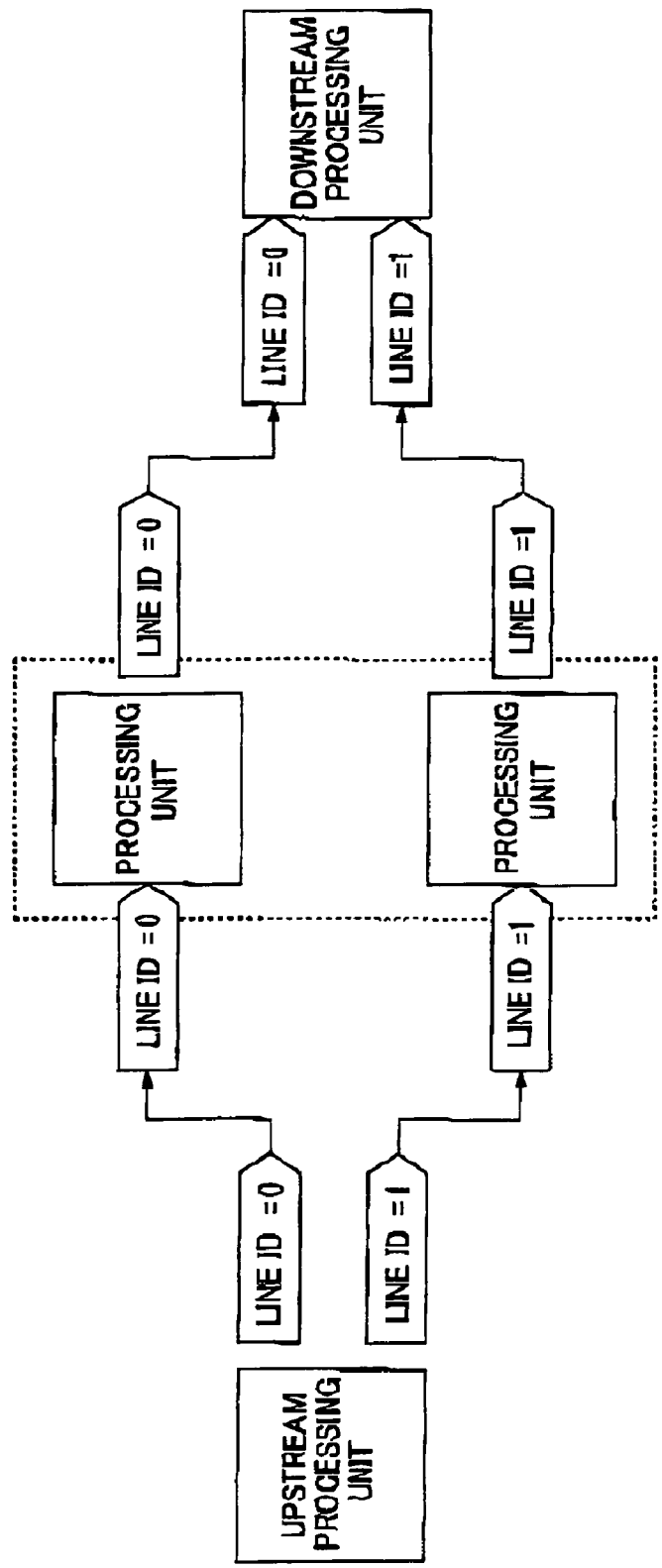
FIG. 24 is a diagram showing another system to which the technology of the data processing system shown in FIG. 15 is applied.

The data processing system 200 has a single input queue 118, a single output queue 178, and a single data transfer line. However, the numbers of queues may be increased to provide a plurality of transfer lines. For example, two transfer lines may be formed as in the system shown in FIG. 24. In such a system with a plurality of transfer lines, flag data to be transferred between the input queue and the output queue on each identical line may be tagged with the ID of that transfer line. This makes it possible to synchronize the queues on the different lines using a single notification signal.

In the data processing systems 100 and 200, the shared memories are used to make notification of the total read number. However, as long as the downstream processing unit or processor can notify the upstream processing unit or processor of the total read number, any method may be used including direct transmission that is based on signal notification.

Moreover, the method of using signal notification and flag data may also be applied to the management of the input queue 20 pertaining to the transmission and reception of data between the upstream processor 10 and the group of processors 40, and the management of the output queue 60 pertaining to the transmission and reception between the group of processors 40 and the downstream processor 70, in the data processing system 100.

Up to this point, the present invention has been described in conjunction with the embodiments thereof. The foregoing embodiments have been given solely by way of illustration. It will be understood by those skilled in the art that various modifications may be made to combinations of the foregoing components and processes without departing from the gist of the present invention, and all such modifications are also intended to fall within the scope of the present invention.

What is claimed is:

1. A data processing system comprising:
a plurality of processors;
an input queue which is divided into two or more number of blocks arranged in a predetermined order of arrangement, each of the blocks being used as a location for storing data to be transferred to any one of the plurality of processors temporarily before transfer, the data being stored in the order of arrangement of the blocks, and transferred in the order stored;
an output queue which is divided into blocks as many as the number of blocks of the input queue arranged in the predetermined order of arrangement, each of the blocks being used as a location for storing data processed by any one of the plurality of processors temporarily before output, the data being output in the order of arrangement of the blocks;
an identifier adding unit which adds an identifier to data to be transferred from the input queue, the identifier corresponding to the order of arrangement of the block that contains this data; and
a block selecting unit which selects one of the blocks of the output queue as a block for storing data processed by a processor, the block having the order of arrangement corresponding to the identifier added to the data.

2. The data processing system according to claim 1, wherein the block selecting unit deletes the identifier added to the data after the block selection.

3. The data processing system according to claim 1, wherein the input queue and the output queue are configured as ring buffers.

4. The data processing system according to claim 3, further comprising:
a storage control unit which controls storage of data in the input queue;
an output counter which counts the total number of times data is output from the output queue; and
an output number notification unit which notifies the storage control unit of the total number of times acquired by the output counter, and wherein the storage control unit includes an input counter which counts the total number of times data is stored in the input queue, and the storage control unit permits the storing of data in the input queue if a difference between the total number of times acquired by the input counter and the total number of times acquired by the output counter is smaller than the number of blocks of the input queue.

5. A data processing system comprising:

a plurality of hardware processing units;

an upstream hardware processing unit which generates data and transfers the generated data to any one of the plurality of hardware processing units; and a downstream hardware processing unit which receives data processed by any one of the plurality of hardware processing units, wherein the upstream hardware processing unit includes:

an input queue which is divided into a plurality of blocks, each of the blocks being used as a location for storing data to be transferred to any one of the plurality of hardware processing units temporarily before transfer;

a transfer target assignment unit which assigns hardware processing units for data to be transferred from the input queue to, from among the plurality of hardware processing units in succession in accordance with a predetermined assignment rule; and a transfer unit which transfers the data to the hardware processing units assigned by the transfer target assignment unit, and wherein the plurality of hardware processing units each have a transfer target location information transmitting unit which transmits transfer target location information when transferring processed data to the downstream hardware processing unit, the transfer target location information indicating a location for the data to be transferred to in the downstream hardware processing unit, and wherein the downstream hardware processing unit includes:

an output queue which is divided into a plurality of blocks, each of the blocks being used as a location for data to be transferred to by any one of the plurality of hardware processing units, and storing the data temporarily before being read;

transfer target location information holding units which are provided for the plurality of hardware processing units, respectively, and which hold transfer target location information transmitted from the respective hardware processing units;

a storing condition information acquisition unit which refers to the transfer target location information holding units and acquires information that is necessary for reading data from the output queue, the information indicating the storing condition of the data in the output queue; and a reference target assignment unit which assigns which of the transfer target location information holding units for the storing condition information acquisition unit to refer to in accordance with a predetermined assignment rule.

6. The data processing system according to claim 5, wherein:

the upstream hardware processing unit, the plurality of hardware processing units, and the downstream hardware processing unit have a local memory each;

the input queue is configured on the local memory of the upstream hardware processing unit;

a reception queue which stores data transferred from the upstream hardware processing unit temporarily and a transmission queue which stores data to be transferred to the downstream hardware processing unit temporarily are configured on the local memory of each of the plurality of hardware processing units;

the output queue is configured on the local memory of the downstream hardware processing unit; and data is transferred between the upstream hardware processing unit and the plurality of hardware processing units and between the plurality of hardware processing units and the downstream hardware processing unit using a direct access memory method.

7. The data processing system according to claim 5, wherein:

the respective blocks of the input queue are arranged in a predetermined order of arrangement, and data is stored in the blocks in the order of arrangement and transferred in the order stored;

the output queue is divided into blocks as many as the number of blocks of the input queue, the blocks are arranged in the predetermined order of arrangement, and data is output in the order of arrangement of the blocks;

the upstream hardware processing unit has an identifier adding unit which adds an identifier to data to be transferred from the input queue, the identifier corresponding to the order of arrangement of a block that contains the data; and the plurality of hardware processing units each have a block selecting unit which selects one of the blocks of the output queue as a block for storing data processed by a hardware processing unit, the block having the order of arrangement corresponding to the identifier added to the data.

8. The data processing system according to claim 6, wherein:

the respective blocks of the input queue are arranged in a predetermined order of arrangement, and data is stored in the blocks in the order of arrangement and transferred in the order stored;

the output queue is divided into blocks as many as the number of blocks of the input queue, the blocks are arranged in the predetermined order of arrangement, and data is output in the order of arrangement of the blocks;

the upstream hardware processing unit has an identifier adding unit which adds an identifier to data to be transferred from the input queue, the identifier corresponding to the order of arrangement of a block that contains the data; and the plurality of hardware processing units each have a block selecting unit which selects one of the blocks of the output queue as a block for storing data processed by a hardware processing unit, the block having the order of arrangement corresponding to the identifier added to the data.

9. The data processing system according to claim 5, wherein the input queue and the output queue are configured as ring buffers.

10. The data processing system according to claim 9, wherein:

the upstream hardware processing unit includes a storage control unit which controls storage of data in the input queue;

the downstream hardware processing unit includes an output counter which counts the total number of times data is read from the output queue, and an output number notification unit which notifies the storage control unit of the total number of times acquired by the output counter;

the storage control unit includes an input counter which counts the total number of times data is stored in the input queue; and the storage control unit permits storing of data in the input queue if a difference between the total number of times acquired by the input counter and the total number of times acquired by the output counter is smaller than the number of blocks of the input queue.

11. A non-transitory computer readable medium having recorded thereon a program for use with a data processing system, wherein the data processing system comprising:

a plurality of processors;

an input queue which is divided into two or more number of blocks arranged in a predetermined order of arrangement, each of the blocks being used as a location for storing data to be transferred to any one of the plurality of processors temporarily before transfer, the data being stored in the order of arrangement of the blocks and transferred in the order stored; and an output queue which is divided into blocks as many as the number of blocks of the input queue arranged in the predetermined order of arrangement, each of the blocks being used as a location for storing data processed by any one of the plurality of processors temporarily before output, the data being output in the order of arrangement of the blocks, the program causing the data processing system to execute:

a procedure for adding an identifier to data to be transferred from the input queue, the identifier corresponding to the order of arrangement of a block that contains the data; and a procedure for selecting one of the blocks of the output queue as a block for storing data processed by a processor, the one having the order of arrangement corresponding to the identifier added to the data.

12. The medium according to claim 11, wherein the input queue and the output queue are configured as ring buffers.

13. A non-transitory computer readable medium having recorded thereon a program for use with a data processing system, wherein the data processing system comprising:

a plurality of processing units;

an upstream processing unit which generates data and transfers the generated data to any one of the plurality of processing units; and a downstream processing unit which receives the data processed by any one of the plurality of processing units, wherein the upstream processing unit includes:

an input queue which is divided into a plurality of blocks, each of the blocks being used as a location for storing data to be transferred to any one of the plurality of processing units temporarily before transfer; and a transfer unit which transfers the data to any one of the plurality of processing units, and wherein the plurality of processing units each have a transfer target location information transmitting unit which transmits transfer target location information when transferring processed data to the downstream processing unit, the transfer target location information indicating a location for the data to be transferred to in the downstream processing unit, and wherein the downstream processing unit includes:

an output queue which is divided into a plurality of blocks, each of the blocks being used as a location for data to be transferred from any one of the plurality of processing units to and storing the data temporarily before read;

transfer target location information holding units which are provided for the plurality of processing units, respectively, and hold the transfer target location information transmitted from the respective processing units; and a storing condition information acquisition unit which refers to the transfer target location information holding units and acquires information that is necessary for reading data from the output queue, the information indicating the storing condition of the data in the output queue, the program causing the data processing system to execute:

a procedure for assigning processing units for data to be transferred from the input queue to, from among the plurality of processing units in succession according to a predetermined assignment rule; and a procedure for assigning which of the transfer target location information holding units for the storing condition information acquisition unit of the downstream processing unit to refer to according to a predetermined assignment rule.

14. The medium according to claim 13, wherein the input queue and the output queue are configured as ring buffers.

* * * * *